US008494331B2

(12) United States Patent
Takeuchi et al.

(10) Patent No.: US 8,494,331 B2
(45) Date of Patent: Jul. 23, 2013

(54) APPARATUS AND METHOD FOR MASS PRODUCING OPTICAL FIBER SPLICE-ON CONNECTOR SUBUNITS

(75) Inventors: Kenichiro Takeuchi, North Brunswick, NJ (US); Haiguang Lu, Los Altos, CA (US)

(73) Assignee: Go!Foton Holdings, Inc., Somerset, NJ (US)

( * ) Notice: Subject to any disclaimer, the term of this patent is extended or adjusted under 35 U.S.C. 154(b) by 179 days.

(21) Appl. No.: 13/176,829

(22) Filed: Jul. 6, 2011

(65) Prior Publication Data

US 2013/0008594 A1 Jan. 10, 2013

(51) Int. Cl.
*G02B 6/00* (2006.01)
(52) U.S. Cl.
USPC ............... 385/135; 385/97; 385/99; 385/134; 385/136; 385/137
(58) Field of Classification Search
USPC ................. 385/95, 96, 97, 99, 134, 135, 136, 385/137
See application file for complete search history.

(56) References Cited

U.S. PATENT DOCUMENTS

| 4,325,607 A | 4/1982 | Carlsen |
| 4,940,307 A | 7/1990 | Aberson et al. |
| 5,121,456 A | 6/1992 | Essert et al. |
| 5,395,025 A | 3/1995 | Borer et al. |
| 5,450,517 A | 9/1995 | Essert |
| 5,812,718 A | 9/1998 | Carpenter et al. |
| 6,033,124 A | 3/2000 | Lesueur et al. |
| 6,122,936 A | 9/2000 | Csipkes et al. |
| 6,203,213 B1 | 3/2001 | Seo et al. |
| 6,325,547 B1 | 12/2001 | Cammons et al. |
| 6,572,743 B2 * | 6/2003 | Miller et al. ............. 204/297.06 |
| 6,742,936 B1 | 6/2004 | Knecht et al. |
| 6,955,479 B2 | 10/2005 | Erdman et al. |

(Continued)

FOREIGN PATENT DOCUMENTS

| JP | 10-039161 | 2/1998 |
| WO | WO-99-27392 | 6/1999 |

(Continued)

OTHER PUBLICATIONS

International Search Report for PCT/US2012/043803, mailed Dec. 28, 2012.

(Continued)

*Primary Examiner* — Jennifer Doan
(74) *Attorney, Agent, or Firm* — White & Case LLP (57) ABSTRACT

The invention provides and apparatus and method for mass producing a plurality of fiber optic mechanical splice-on connector subunits. The apparatus utilizes a magazine detachably mounted on a frame and containing a plurality of slots. The slots contain a plurality of subunits, each of which includes a ferrule assembly carrying a fiber stub coated in uncured epoxy. The slots are moved through a cleaving zone on the apparatus defined by the area between a cleaver and fiber holder, wherein the fiber stubs are cleaved and then pulled so the portion of the fiber stub extending from the ferrule assembly to the cleaved end has a specified length. After cleaving and pulling all the fiber stubs in the magazine, the magazine is detached from the apparatus and moved to an oven wherein the epoxy is cured. After cooling, the subunits and removed from the magazine to provide a plurality of subunits, each containing a cleaved fiber stub securely oriented therein.

26 Claims, 7 Drawing Sheets

U.S. PATENT DOCUMENTS

| | | |
|---|---|---|
| 7,014,372 B2 | 3/2006 | Watte et al. |
| 7,216,512 B2 | 5/2007 | Danley et al. |
| 7,270,487 B2 | 9/2007 | Billman et al. |
| 7,369,738 B2 | 5/2008 | Larson et al. |
| 7,572,064 B2 | 8/2009 | deJong |
| 7,637,673 B2 | 12/2009 | Oike et al. |
| 7,658,549 B2 | 2/2010 | Elkins et al. |
| 7,680,384 B2 | 3/2010 | Billman et al. |
| 7,712,974 B2 | 5/2010 | Yazaki et al. |
| 7,822,309 B2 * | 10/2010 | Bianchi ......................... 385/134 |
| 8,371,761 B2 | 2/2013 | Heidler et al. |
| 2002/0031323 A1 | 3/2002 | Hattori et al. |
| 2003/0081910 A1 | 5/2003 | Gimbel et al. |
| 2006/0263028 A1 | 11/2006 | Honma |
| 2009/0162019 A1 | 6/2009 | Lichoulas et al. |
| 2011/0091166 A1 | 4/2011 | Benjamin et al. |
| 2012/0328251 A1 | 12/2012 | Takeuchi et al. |
| 2013/0008594 A1 | 1/2013 | Takeuchi et al. |
| 2013/0022324 A1 | 1/2013 | Takeuchi et al. |

FOREIGN PATENT DOCUMENTS

| | | |
|---|---|---|
| WO | WO-02-074505 | 9/2002 |
| WO | WO-03-003087 | 1/2003 |
| WO | WO 2012-178050 | 12/2012 |
| WO | WO 2013-006646 | 1/2013 |
| WO | WO 2013-012559 | 1/2013 |

OTHER PUBLICATIONS

Written Opinion for PCT/US2012/043803, mailed Dec. 28, 2012.
International Search Report for PCT/US2012/045457, mailed Jan. 3, 2013.
Written Opinion for PCT/US2012/045457, mailed Jan. 3, 2013.
International Search Report for PCT/US2012/045461, mailed Jan. 3, 2013.
Written Opinion for PCT/US2012/045461, mailed Jan. 3, 2013.

* cited by examiner

APPARATUS AND METHOD FOR MASS PRODUCING OPTICAL FIBER SPLICE-ON CONNECTOR SUBUNITS

FIELD OF THE INVENTION

The present invention relates to the field of fiber optics, particularly angle cleaved mechanical splice-on (SC. FC and LC) angled physical contact ("APC") connectors. In particular, the invention concerns an apparatus and method for mass producing subunits used in the manufacture of mechanical splice-on (SC, FC and LC)—APC connectors in the industry. The apparatus and method facilitate mass production of subunits that precisely control the orientation of the fiber stub contained therein and the length of the fiber stub portion extending from the subunit to the cleaved tip.

BACKGROUND OF THE INVENTION

In the fiber optics communication industry, optical fibers are used in a growing number of ways, particularly out in the field in residential and commercial structures. There is an ever-increasing need to provide better ways of connecting optical fibers so that insertion and return losses are controlled and optimized. Fusion splicing yields connections with precisely controlled insertion and return losses. Fusion splicing is typically accomplished in the factory, in the telecom central office, because the operators are well trained, and the facility is well controlled. There are many field fusion splicer available, but are not really cost effective for mass terminations. The angle cleaved mechanical splice-on (SC, FC, LC)—APC connector is a very attractive solution, it insures the optical performance and required mechanical quality for the applications in the field such as FTTX.

Mechanical splice-on connectors have grown in use and are now generally the best known means by which optical fibers may be connected to one another in the field in a more controlled way, such as terminating in a small closure box on the wall or in the closet, instead of just using a single mechanical splicer joint. Mechanical splice-on connectors typically use a subunit containing a ferrule base, a ferrule mounted within the ferrule base, and an internal fiber, called a fiber stub, running through an axial bore in the subunit and extending from both ends of the subunit with one end factory polished and the other open end buried inside the ferrule. To mate with a field fiber, one end of the fiber stub extending from the subunit is cleaved, typically at an angle to insure the RL spec. The other end of the fiber stub, which extends from the opposite end of the subunit is typically cut and polished so that the ferrule and fiber stub may be mated with another connector. Fusion splice-on factory pre-made connector is in use for many years, however it is not as cost effective as angle cleaved mechanical splice-on (SC, FC, LC)—APC connector.

When mass producing such subunits, it is critical that the subunits are identical in terms of the radial orientation of the fiber stub within the subunit and in terms of the length of the portion of the fiber stub extending from the subunit to the cleaved end. It would be ideal to provide an apparatus and method for mass producing such subunits having a controlled radial orientation and fixed length of the portion of the fiber stub extending from the subunit to the cleaved end, within acceptable tolerances. The invention provides an apparatus and method for achieving this objective.

SUMMARY OF THE INVENTION

The apparatus for mass producing a plurality of fiber optic angle cleaved mechanical splice-on APC connector subunits is generally described as follows. The apparatus utilizes a magazine detachably mounted on a frame and containing a plurality of slots. A connector subunit is disposed in each slot in the magazine. Each connector subunit has an axial bore that captures a middle portion of a fiber stub coated with uncured epoxy. The magazine has a portion disposed between a cleaver and a fiber holder aligned with the cleaver. The area between the cleaver and aligned fiber holder define a cleaving zone. Each slot in the magazine may be individually and sequentially disposed within the cleaving zone either by movement of the magazine or by movement of the cleaver and fiber holder. As a slot is disposed in the cleaving zone, a first portion of the fiber stub extending from the subunit is cleaved. Thereafter, the fiber holder grasps a second portion of the fiber stub extending from the other side of the subunit, and the fiber holder is used to pull the fiber stub until the first portion of the fiber stub extending from the subunit has a specified length. The cleaving and pulling processes are performed without changing the radial orientation of the fiber stub within the subunit.

This process is carried out for each slot in the magazine having a connector subunit until the fiber stub in each subunit in the magazine has been cleaved and pulled. Thereafter, the magazine is detached from the frame and moved to an oven to cure the epoxy, which firmly sets the fiber stub within the subunit. Finally, the subunits are removed from the magazine to provide a plurality of subunits, each containing a cleaved fiber stub therein. The second portion is then cut at the juncture with the ferrule and is polished. The apparatus and process precisely control the orientation of the fiber stub within the subunit and the length of the first portion of the fiber stub extending from the subunit to the cleaved end. In this manner, the plurality of subunits produced by the apparatus and method are essentially identical, within an acceptable tolerance range. The subunits may then be used with a field-installable mechanical connectors for terminating optical fibers in the field.

The invention will now be described in greater detail with reference to a particular embodiment in which the magazine is movable. The apparatus is supported by a frame. A cleaver is mounted on the frame. The cleaver is preferably a flat edge angled cleaver that is capable of cleaving the tip of a fiber stub with an angled flat edge. A track is also mounted on the frame in alignment with the cleaver. The track contains a fiber holder slidably mounted therein. The fiber holder is also in alignment with the cleaver. The fiber holder moves on the track toward and away from the cleaver. The area between the cleaver and the fiber holder defines a cleaving zone.

A magazine is movably mounted on the frame and is also detachable from the frame. The magazine includes a plurality of slots. As the magazine moves on the frame, each slot is individually disposed within the cleaving zone and in alignment with the cleaver and fiber holder. The magazine includes a plurality of subunits, each of which is mounted in one of the plurality of slots. Each subunit comprises a ferrule base, and a ferrule mounted in the ferrule base. An axial bore for receiving a fiber stub runs through the ferrule base and the ferrule. In a preferred embodiment, the ferrule base has a cylindrical longitudinal exterior and has a stepped coaxial bore comprising the axial bore for receiving the fiber stub and a larger bore for receiving a portion of the ferrule.

The subunit also includes a fiber stub contained within the subunit. In particular, the fiber stub has a middle portion captured within the axial bore running through the ferrule base and the ferrule. The fiber stub also has a first portion extending out of the subunit from the ferrule base and ending at a tip. In addition, the fiber stub has a second portion extending out of the subunit from the ferrule.

Each slot in the magazine includes a locking portion. Each subunit contains a keying portion for engaging the locking portion of the slot to prevent the subunit from rotating within the slot. In a preferred embodiment, the keying portion of each subunit comprises flattened parallel sides along the longitudinal exterior of the ferrule base, and the locking portion of each slot comprises flattened edges on the slots for securely receiving the flattened parallel sides of the ferrule base.

The cleaver is capable of cleaving the tip of the first portion of said fiber stub when the slot is disposed in the cleaving zone without changing the radial orientation of the fiber within the subunit. The fiber holder is capable of grasping the second portion of said fiber stub when the slot is disposed in the cleaving zone and pulling on the fiber, without changing the radial orientation of the fiber within the subunit, until the first portion has a specified length, In one preferred embodiment, the magazine comprises a disk-shaped tray mounted on the frame and rotatable about a center axis. The disk-shaped tray contains a hole at the center axis and a circumferential band at a distance from the center axis. The circumferential band passes through the cleaving zone. The slots of the magazine are disposed on the circumferential band and oriented radially around the center axis. The cleaver is disposed within the hole inside the circumferential band, and the track containing the fiber holder is disposed outside the circumferential band. As the disk-shaped tray rotates, it disposes each slot on the circumferential band individually within the cleaving zone and into alignment with the cleaver and fiber holder mounted on the track.

In another preferred embodiment, the magazine comprises a rectangular-shaped tray. The rectangular-shaped tray is linearly moveable on the frame. The slots of the magazine are disposed on the rectangular-shaped tray and are oriented normal to the direction of movement of the tray. As the rectangular tray moves linearly along the frame, it disposes each slot on the tray individually within the cleaving zone and into alignment with the cleaver and fiber holder mounted on the track. In this embodiment, the cleaver and the track containing the fiber holder are disposed on opposite sides of the tray to align with each slot as the slot is disposed in the cleaving zone.

In embodiments wherein the magazine is movable, such as those described above, the method of the invention is performed as follows. First, an epoxy is applied into the axial bore in the ferrule base of the subunit. Thereafter, the fiber stub is inserted from the exterior of the subunit into the axial bore in the ferrule base and through the axial bore in the ferrule so that the middle portion of the fiber stub is at least partially coated with said epoxy. The subunit is then placed in a slot in the magazine and the keying portion of the subunit is engaged with the locking portion of the slot. These steps are repeated for a plurality of subunits to fill a corresponding plurality of slots in the magazine.

After the magazine is filled with the subunits, the magazine is mounted on the frame and moved on the frame to orient a slot containing a subunit within the cleaving zone. At this point, the cleaver is engaged to cut the tip of the first portion of the fiber stub contained within the subunit. The cleaver is then disengaged from the first portion. The fiber holder is engaged to the second portion (either before or after the cleaving process) to grasp the second portion of the fiber stub. The fiber holder is then moved along the track away from the cleaver, without changing the radial orientation of the fiber stub within the subunit, until the first portion of the fiber stub has a specified length, and the moved fiber drags epoxy along and fully filled within the ferrule for curing. The fiber holder is then disengaged from the second portion. These steps of cleaving and pulling the fiber stub contained within each subunit are repeated for each slot containing a subunit in the magazine, until they have all been completed.

The magazine is then detached from the frame and placed in an oven to cure the epoxy within the subunits. Thereafter, the magazine is removed from the oven and allowed to cool. The keying portion of each subunit is then disengaged from the locking portion of the slot to remove each subunit from the magazine and provide a plurality of subunits, each having the fiber stub disposed at a fixed radial orientation therein and having a first portion with a specified length ending at the cleaved tip. The second portion is then cut and the juncture and with the ferrule and the exposed end is polished (into an APC) so that it may be connected with a ferrule in another factory made APC connector.

In another embodiment, the apparatus is similar structure to those described above, but in this case, the cleaver and the track containing the fiber holder are movably mounted on the frame. In this embodiment, a cleaver is movably mounted on the frame. In addition, a track is movably mounted on the frame in alignment with the cleaver. Otherwise, the structure is similar to that described above. The cleaver and track containing the fiber holder move on the frame to orient the cleaving zone into alignment with each individual slot in the subunit.

For example, in an embodiment case where the magazine comprise a fixed disk-shaped tray containing a hole at the center axis and a circumferential band disposed in the cleaving zone (like the disk-shaped tray described above), the cleaver is disposed within the hole inside the circumferential band and is rotatable therein, and the track containing the fiber holder is disposed outside the circumferential band, and the track is further mounted on a circular track extending around the outside of the circumferential band. In this embodiment, the cleaver may be rotated and the track containing the fiber holder may be moved around the circular track to orient the cleaving zone into alignment with each individual slot in the magazine.

In another example, in an embodiment case where the magazine comprise a fixed rectangular-shaped tray (like the rectangular-shaped tray described above), the cleaver and track containing the fiber holder are slidably disposed within linear tracks on opposite sides of the tray, which linear tracks are parallel to the longitudinal axis of the tray. In this embodiment, the cleaver and track containing the fiber holder may be moved along their respective linear tracks to orient the cleaving zone into alignment with each individual slot in the magazine.

In embodiments where the cleaver and track containing the fiber move along the frame, the steps for carry out the method according to the invention are similar to those described above with the exception that the cleaver and track containing the fiber holder are moved on the frame, rather than moving the magazine in order to orient the cleaving zone into alignment with each slot in the magazine.

BRIEF DESCRIPTION OF THE DRAWINGS

This specification makes reference to the following figures wherein like reference numerals designate like parts in the figures.

DETAILED DESCRIPTION OF THE INVENTION

Figure 1:
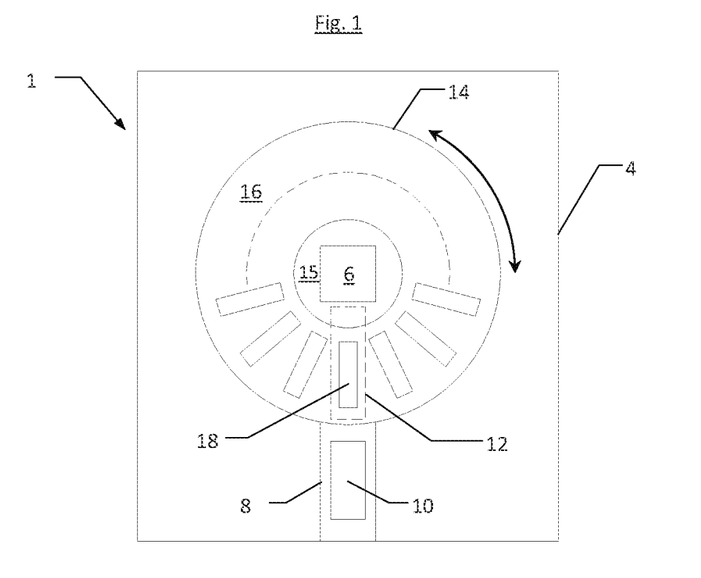
FIG. 1 shows a top view of a first embodiment of the apparatus according to the invention.

The invention will first be described by reference to its structure and thereafter further described by reference the method of carrying out the invention. FIG. 1 shows a first preferred embodiment of the invention. Referring to FIG. 1, the invention provides an apparatus 1 for mass producing a plurality of fiber optic mechanical splice-on connector subunits. The apparatus 1 is supported by a frame 4. A cleaver 6 is mounted on the frame. The cleaver 6 is preferably a flat edge angled cleaver (for example, made by IL Sintech Co. Ltd.) that is capable of cleaving the tip of a fiber stub with an angled flat edge. The particular angle used is typically 8° although other angles may be employed. A track 8 is mounted on the frame 4 in alignment with the cleaver 6. A fiber holder 10 is slidably mounted on the track 8. The fiber holder 10 is slidably movable toward and away from the cleaver 6. The area between the cleaver 6 and the fiber holder 10 defines a cleaving zone 12.

Figure 2:
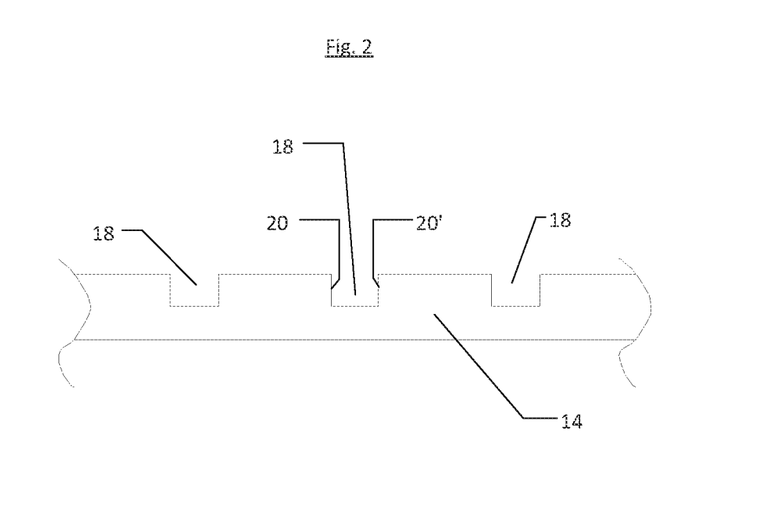
FIG. 2 shows a side view of a section of the disk-shaped tray shown in FIG. 1.

A magazine in the form of a disk-shaped tray 14 is mounted on the frame 4 and is rotatable about a center axis. The disk-shaped tray 14 is detachable from the frame 4. The disk-shaped tray 1.4 contains a hole 15 at the center axis and a circumferential band 16 at a distance from the center axis. The cleaver 6 is mounted on frame 4 within the hole 15, and the track 8 containing the fiber holder 10 is mounted on frame 4 outside the circumferential band 16 in alignment with the cleaver 6. The disk-shaped tray 14 contains a plurality of slots 18, which are disposed on the circumferential band 16 and oriented radially around the center axis of the disk-shaped tray 14. With this structure, the circumferential band 16 of the disk-shaped tray 14 passes through the cleaving zone 12. As the disk-shaped tray 14 is rotated, each slot 18 is individually disposed within the cleaving zone 12 and into alignment with the cleaver 6 and the fiber holder 10. Each slot 18 on the disk-shaped tray 14 further includes a locking portion. The locking portion preferably comprises two flattened edges 20 and 20' in each slot, as shown in FIG. 2.

Figure 3:
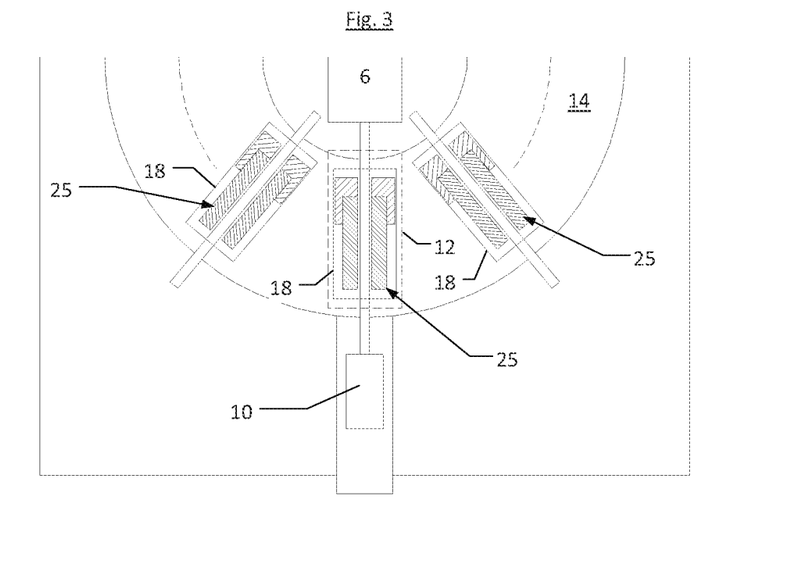
FIG. 3 shows a close-up top view of the apparatus according to the invention with subunits according to the invention loaded into the slots of the disk-shaped tray.
Figure 4:
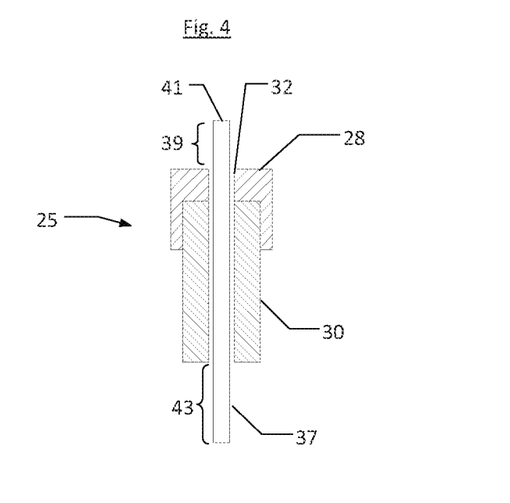
FIG. 4 shows a side cross-section of the subunit according to the invention.

FIG. 3 shows a close-up top view of a section of the disk-shaped tray 14, wherein each slot 18 is loaded with a subunit 25 according to the invention. FIGS. 4 shows a top view of each subunit 25. Each subunit comprises a ferrule base 28, and a ferrule 30 mounted in the ferrule base 28. The ferrule base 28 and ferrule 30 contain an axial bore 32 running there-through for receiving a fiber stub 37.

Figure 5A:
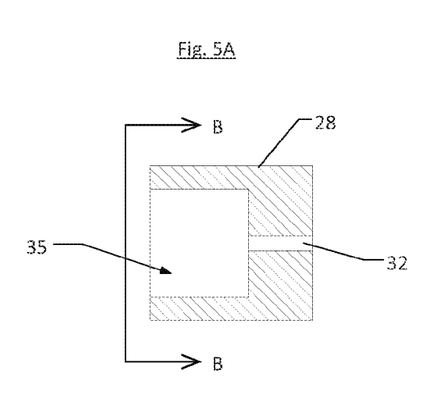
FIG. 5A shows a side cross-section of the ferrule base according to the invention.
Figure 5B:
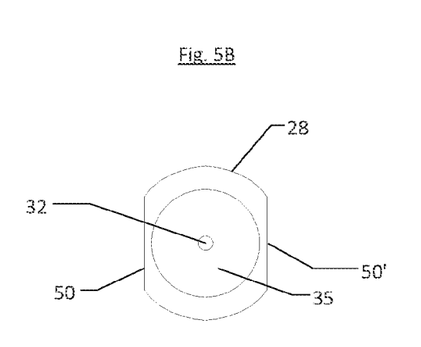
FIG. 5B shows an axial view of the of the ferrule according to the invention taken along lines B-B of FIG. 5A.
Figure 6:
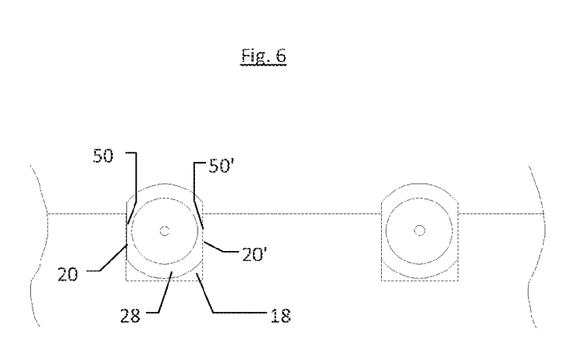
FIG. 6. shows a side view of a section of the disk-shaped tray shown in FIG. 1 with subunit loaded therein according to the invention.

As shown in FIGS. 5A and 5B, the ferrule base 28 preferably has a cylindrical longitudinal exterior and has a stepped coaxial bore comprising the axial bore 32 for receiving the fiber stub and a larger bore 35 for receiving a portion of the ferrule 30. As further shown in FIG. 5B, the ferrule base 28 has keying portion preferably composed of flattened parallel sides 50 and 50 for engaging the flattened edges 20 and 20' of the slot 18, respectively to prevent the subunit 25 from rotating within the slot 18. FIG. 6, shows the engagement of the flattened parallel sides 50 and 50' on the ferrule base 28 of a subunit 25 to the flattened edges 20 and 20' of the slot 18.

Referring again to FIG. 4, the fiber stub 37 is mounted within each subunit 25 and has a middle portion captured within the axial bore 32 in the ferrule base 28 and ferrule 30. The fiber stub 37 also has a first portion 39 extending out of the subunit 25 from the ferrule base 28, ending at a tip 41. The fiber stub 37 also has a second portion 43 extending out of the subunit 25 from the ferrule 30.

Figure 7A:
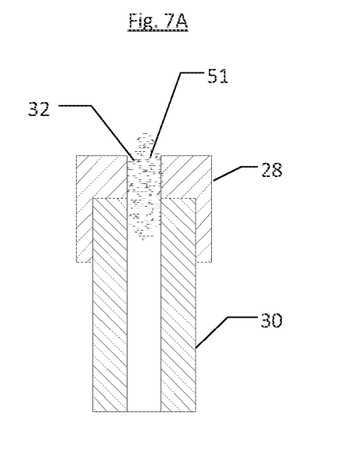
FIG. 7A shows a side cross-section of the subunit according to the invention with epoxy filled in the ferrule base thereof.
Figure 7B:
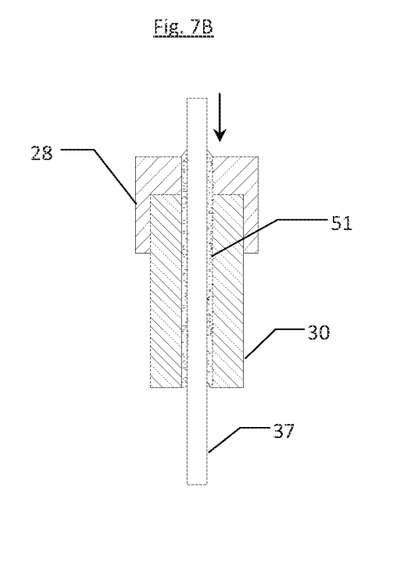
FIG. 7B shows a side cross-section of the subunit according he invention with the fiber stub inserted therein.

The method of the invention utilizes the foregoing embodiment as follows. As shown in FIG. 7A, the manufacturer first applies an epoxy Si into the axial bore 32 in the ferrule base 28 of the subunit 25. Thereafter, as shown in FIG. 7B, the fiber stub 37 is inserted from the exterior of the subunit 25 into the axial bore 32 in the ferrule base 28 (from the direction shown by the arrow in the figure) and through the axial bore 32 in the ferrule 30 whereby the middle portion of the fiber stub is at least partially coated with said epoxy.

The subunit 25 containing the fiber stub 37 therein is then pushed within a slot 18 in the disk-shaped tray so that the flattened parallel sides 50 and 50' of the ferrule base 28 fit securely against the flattened portions 20 and 20' of the slot as shown in FIG. 6. These steps are repeated until each slot 18 in the disk-shaped tray 14 is loaded with an epoxy filled subunit 25 containing a fiber stub 37 therein. Thereafter, the disk-shaped tray is mounted on the frame.

Figure 8A:
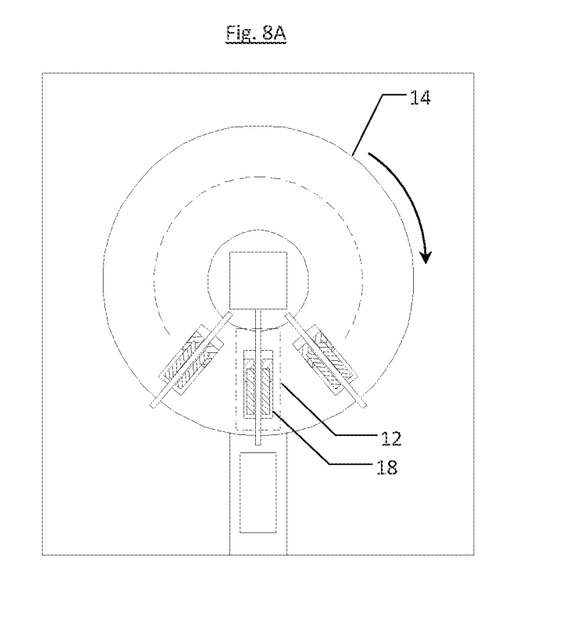
FIG. 8A shows a top view of the apparatus according to the invention with subunits according to the invention loaded into the slots of the disk-shaped tray.
Figure 8B:
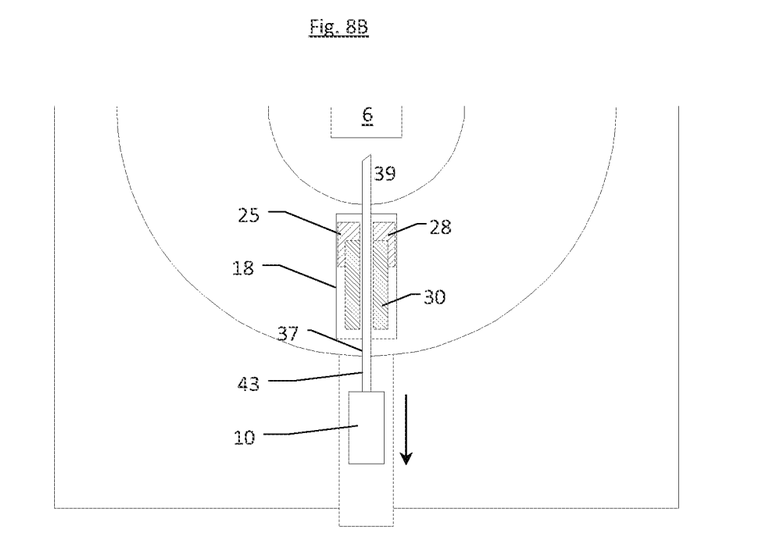
FIG. 8B shows a close-up of a section of FIG. 8A after the fiber holder grasping a second portion of the fiber stub has been moved away from the cleaver.

With reference to FIG. 8A, once mounted on the frame, the disk-shaped tray 14 is rotated on the frame to orient a slot 18 containing a subunit 25 within the cleaving zone 12. Once the subunit 25 is oriented within the cleaving zone 12, the cleaver 6 is engaged to cut the tip 41 of the fiber stub 37. The cleaver 6 is then disengaged. As shown in the close-up in FIG. 8B, at this point, the fiber holder 10 mounted on the track S is engaged to grasp the second portion 43 of the fiber stub 37. The fiber holder 10 is then moved along the track 8 away from the cleaver 6 (in the direction of the arrow shown in FIG. 3). The fiber holder 10 typically has a conventional v-groove design and grasps the fiber stub 27 securely, so that as the fiber holder 10 moves away from the cleaver 6, the radial orientation of the fiber stub 37 within the subunit 25 will not change. The fiber holder 10 is moved along the track away from the cleaver until the first portion 39 of the fiber stub 37 is at a specified length. The fiber holder 10 is then disengaged from the second portion 43 of the fiber stub. These process steps are repeated for each slot 18 in the disk-shaped tray 1.4 containing a subunit 25.

After the fiber stub 37 in each subunit 25 is cleaved and pulled as described above, the disk-shaped tray 14 is detached from the frame 4 and placed in an oven (not shown) to cure the epoxy 51 within the subunits 25. Once, the epoxy 51 is cured, the disk-shaped tray 14 is removed from the oven, and cooled. Thereafter, the keying portion flattened parallel edges 50 and 50 are disengaged from the locking flattened portions 20 and 20' of the slot (for example, by prying the subunit out of the slot) to remove each subunit from the magazine. This in turn, provides a plurality of subunits 25, each having the fiber stub 37 disposed at a fixed radial orientation therein.

Figure 9:
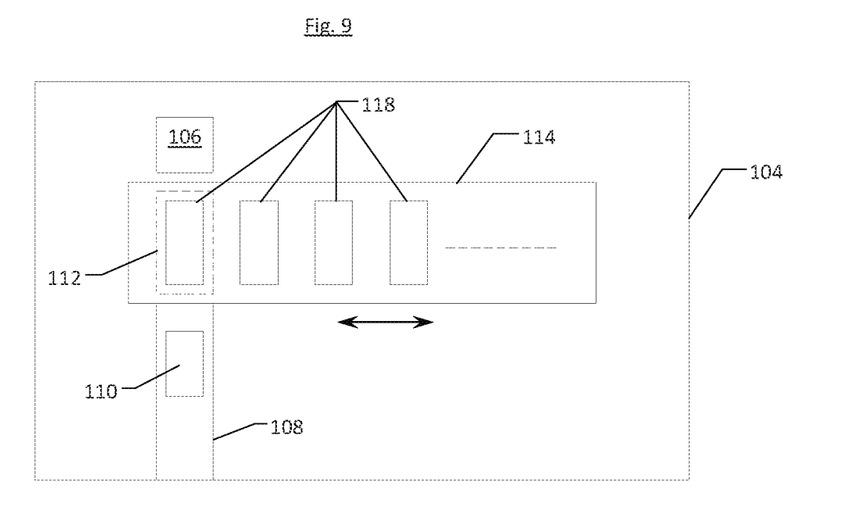
FIG. 9 shows a second embodiment of the invention wherein the magazine comprises a rectangular-shaped tray movable on the frame.

FIG. 9 shows another embodiment of the invention. In this embodiment, the magazine comprises a rectangular-shaped tray 114 linearly moveable on the frame 104 (see arrows in the figure) through the cleaving zone 112. The slots 118 are disposed on the tray 114 and oriented normal to the direction of movement of the tray 114. The cleaver 106 and the track 108 containing the fiber holder 110 are disposed on opposite sides of the tray 114 to align with each slot 118 as the slot is disposed in the cleaving zone 112. This embodiment otherwise functions the same as the embodiment described in FIGS. 1-9.

Figure 10:
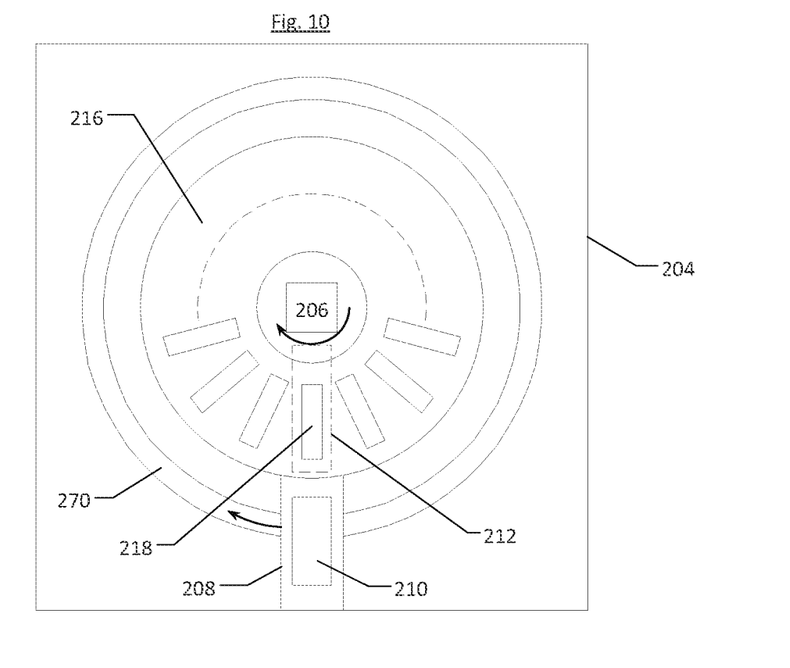
FIG. 10 shows a third embodiment of the invention wherein the magazine comprises a disk-shaped trayed and the cleaver and track containing the fiber holder are movable on the frame.

FIG. 10 shows another embodiment of the invention, similar in structure similar to the embodiment shown in FIGS. 1-9. In this embodiment, however, the disk-shaped tray 214 is not movable on the frame and the cleaver 206 and track 208 containing the fiber holder 210 are movably mounted on the frame. In particular, the cleaver 206 is disposed within the 215 hole inside the circumferential band 216 and is rotatable therein. The track 208 containing the fiber holder 210 is movably mounted on a circular track 270 disposed outside the circumferential band 216. In this embodiment, the cleaver 206 may be rotated and the track 208 containing the fiber holder 210 may be moved around the circular track 270 to orient the cleaving zone 212 into alignment with each individual slot 218 in the disk-shaped tray 214. The steps for Carry out the method according to the invention are similar to those described above with the exception that the cleaver 206 and track 208 containing the fiber holder 210 are moved on the frame 204, rather than moving the disk-shaped tray 214.

Figure 11:
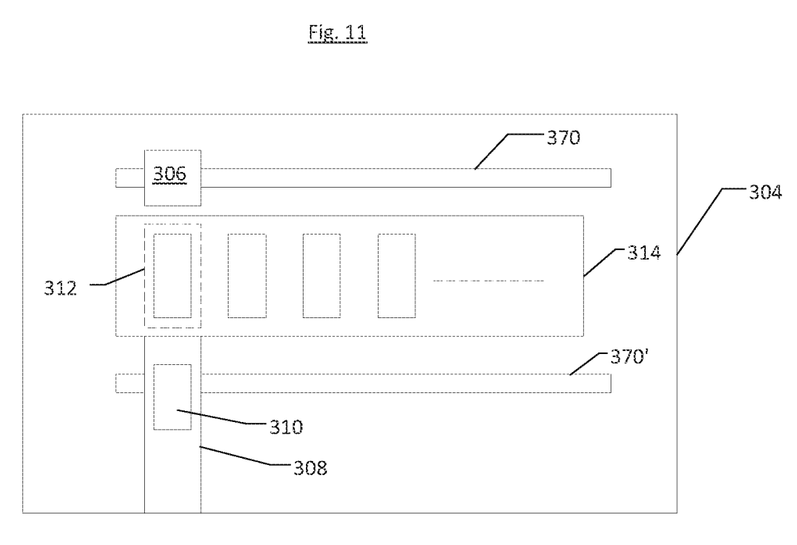
FIG. 11. shows a fourth embodiment of the invention wherein the magazine comprises a rectangular-shaped tray and the cleaver and track containing the fiber holder are movable on the frame.

FIG. 11 shows another embodiment of the invention, similar in structure similar to the embodiment shown in FIG. 9. In this embodiment, however, the rectangular-shaped tray 314 is not movable on the frame 304 and the cleaver 306 and track 308 containing the fiber holder 310 are movably mounted on the frame. In particular, the cleaver 306 and track 308 containing the fiber holder 310 are slidably disposed within linear tracks 370 and 370' on opposite sides of the tray. The linear tracks 370 and 370' are parallel to the longitudinal axis of the rectangular-shaped tray 314. In this embodiment, the cleaver 306 and track 308 containing the fiber holder 310 may be moved along their respective linear tracks 370 and 370' to orient the cleaving zone 312 into alignment with each individual slot 318 in the rectangular tray 314. The steps for carry out the method according to the invention are similar to those described above with the exception that the cleaver 306 and track 308 containing the fiber holder 310 are moved on the frame 304, rather than moving the rectangular-shaped tray 314.

In addition to the embodiments of the present invention described above, those skilled in the art will be able to arrive at a variety of other arrangements and steps which, if not explicitly described in this document, nevertheless embody the principles of the invention and fall within the scope of the appended claims.

What is claimed is:

1. An apparatus for mass producing a plurality of fiber optic mechanical splice-on connector subunits, the apparatus comprising:
    (a) a frame;
    (b) a cleaver mounted on the frame;
    (c) a track mounted on the frame in alignment with the cleaver;
    (d) a fiber holder slidably mounted on the track and movable toward and away from the cleaver, the area between the cleaver and the fiber holder defining a cleaving zone;
    (e) a magazine including a plurality of slots, each slot including a locking portion, the magazine movably mounted on the frame for disposing each slot individually within the cleaving zone and in alignment with the cleaver and fiber holder, the magazine detachable from the frame; and
    (f) a plurality of subunits, each subunit mounted in a slot of the magazine, each subunit comprising:
        (i) a ferrule base, a ferrule mounted in the base, an axial bore running through the ferrule base and ferrule, the axial bore for receiving a fiber stub;
        (ii) a fiber stub having a middle portion captured within the axial bore and having a first portion extending out of the subunit from the ferrule base, the first portion ending at a tip, and a second portion extending out of the subunit from the ferrule; and
        (iii) a keying portion for engaging the locking portion of the slot to prevent the subunit from rotating within the slot;
    wherein the cleaver is capable of cleaving the tip of the first portion of said fiber stub when the slot is disposed in the cleaving zone without changing the radial orientation of the fiber within the subunit; and
    wherein the fiber holder is capable of grasping the second portion of said fiber stub when the slot is disposed in the cleaving zone and pulling on the fiber, without changing the radial orientation of the fiber within the subunit, until the first portion has a specified length.

2. The apparatus according to claim 1, wherein:
    the keying portion of each subunit comprises flattened parallel sides along the longitudinal exterior of the ferrule base; and
    the locking portion of each slot comprises flattened edges on the slots for securely receiving the flattened parallel sides of the ferrule base.

3. The apparatus according to claim 2, wherein the ferrule base has a cylindrical longitudinal exterior and has a stepped coaxial bore comprising the axial bore for receiving the fiber stub and a larger bore for receiving a portion of the ferrule.

4. The apparatus according to claim 3, wherein the cleaver is a flat edge angled cleaver that is capable of cleaving the tip with a angled flat edge.

5. The apparatus according to claim 1, wherein:
    the magazine comprises a disk-shaped tray mounted on the frame and rotatable about a center axis, the disk-shaped tray containing a hole at the center axis and a circumferential band that moves through the cleaving zone;
    the slots of the magazine are disposed on the circumferential band and oriented radially around the center axis,
    the cleaver is disposed within the hole inside the circumferential band; and
    the track containing the fiber holder are disposed outside the circumferential band.

6. The apparatus according to claim 5, wherein:
the keying portion of each subunit comprises flattened parallel sides along the longitudinal exterior of the ferrule base; and
the locking portion of each slot comprises flattened edges on the slots for securely receiving the flattened parallel sides of the ferrule base.

7. The apparatus according to claim 6, wherein, the ferrule base has a cylindrical longitudinal exterior and has a stepped coaxial bore comprising the axial bore for receiving the fiber stub and a larger bore for receiving a portion of the ferrule.

8. The apparatus according to claim 7, wherein the cleaver is a edge angled cleaver that is capable of cleaving the tip with a angled flat edge.

9. The apparatus according to claim 1, wherein:
the magazine comprise a rectangular-shaped tray linearly moveable on the frame through the cleaving zone;
the slots of the magazine are disposed on the tray and oriented normal to the direction of movement of the tray; and
the cleaver and the track containing the fiber holder are disposed on opposite sides of the tray to align with each slot as said slot is disposed in the cleaving zone.

10. The apparatus according to claim 9, wherein:
the keying portion of each subunit comprises flattened parallel sides along the longitudinal exterior of the ferrule base; and
the locking portion of each slot comprises flattened edges on the slots for securely receiving the flattened parallel sides of the ferrule base.

11. The apparatus according to claim 10, wherein, the ferrule base has a cylindrical longitudinal exterior and has a stepped coaxial bore comprising the axial bore for receiving the fiber stub and a larger bore for receiving a portion of the ferrule.

12. The apparatus according to claim 11, wherein the cleaver is a flat edge angled cleaver that is capable of cleaving the tip with a angled flat edge.

13. An apparatus for mass producing fiber optic mechanical splice-cm connector subunits, the apparatus comprising:
(a) a frame;
(b) a cleaver movably mounted on the frame;
(c) a track movably mounted on the frame in alignment with the cleaver;
(d) a fiber holder slidably mounted on the track and movable toward and away from the cleaver, the area between the cleaver and the fiber holder defining a cleaving zone;
(e) a magazine including a plurality of slots, each slot including a locking portion, the magazine detachable from the frame; and
(f) a plurality of subunits, each subunit mounted in a slot of the magazine, each subunit comprising:
(i) a ferrule base, a ferrule mounted in the base, an axial bore running through the ferrule base and ferrule, the axial bore for receiving a fiber stub;
(ii) a fiber stub having a middle portion captured within the axial bore and having a first portion extending out of the subunit from the ferrule base, the first portion ending at a tip, and a second portion extending out of the subunit from the ferrule; and
(iii) a keying portion for engaging the locking portion of the slot to prevent the subunit from rotating within the slot;
wherein the cleaver and track containing the fiber holder move on the frame to orient the cleaving zone into alignment with each individual slot in the subunit;
wherein the cleaver is capable of cleaving the tip of the first portion of said fiber stub when the slot is disposed in the cleaving zone without changing the radial orientation of the fiber within the subunit; and
wherein the fiber holder is capable of grasping the second portion of said fiber stub when the slot is disposed in the cleaving zone and pulling on the fiber, without changing the radial orientation of the fiber within the subunit, until the first portion has a pre-specified length.

14. The apparatus according to claim 13, wherein:
the keying portion of each subunit comprises flattened parallel sides along the longitudinal exterior of the ferrule base; and
the locking portion of each slot comprises flattened edges on the slots for securely receiving the flattened parallel sides of the ferrule base.

15. The apparatus according to claim 14, wherein, the ferrule base has a cylindrical longitudinal exterior and has a stepped coaxial bore comprising the axial bore for receiving a portion of the fiber stub and a larger bore for receiving a portion of the ferrule.

16. The apparatus according to claim 15, wherein the cleaver is a flat edge angled cleaver that is capable of cleaving the tip with a angled flat edge.

17. The apparatus according to claim 13, wherein:
the magazine comprises a disk-shaped tray mounted on the frame, the disk-shaped tray containing a hole at the center axis and a circumferential band disposed in the cleaving zone;
the slots of the magazine are disposed on the circumferential band and oriented radially around the center axis,
the cleaver is disposed within the hole side the circumferential band and is rotatable therein: and
the track containing the fiber holder is disposed outside the circumferential band, said track containing the fiber holder is further mounted on a circular track;
wherein the cleaver may be rotated and the track containing the fiber holder may be moved around the circular track to orient the cleaving zone into alignment with each individual slot in the magazine.

18. The apparatus according to claim 17, wherein:
the keying portion of each subunit comprises flattened parallel sides along the longitudinal exterior of the ferrule base; and
the locking portion of each slot comprises flattened edges on the slots for securely receiving the flattened parallel sides of the ferrule base.

19. The apparatus according to claim 18, wherein, the ferrule base has a cylindrical longitudinal exterior and has a stepped coaxial bore comprising a an axial bore for receiving a portion of the fiber stub and a larger bore for receiving a portion of the ferrule.

20. The apparatus according to claim 19, wherein the cleaver is flat edge angled cleaver that is capable of cleaving the tip with a angled flat edge.

21. The apparatus according to claim 13, wherein:
the magazine comprise a rectangular-shaped tray;
the slots of the magazine are disposed on the tray and oriented normal to the longitudinal axis of the tray; and
the cleaver and track containing the fiber holder are slidably disposed within linear tracks on opposite sides of the tray, said linear tracks parallel to the longitudinal axis of the tray;
wherein the cleaver and track containing the fiber holder may be moved along their respective linear tracks to orient the cleaving zone into alignment with each individual slot in the magazine.

22. The apparatus according to claim 21, wherein:
the keying portion of each subunit comprises flattened parallel sides along the longitudinal exterior of the ferrule base; and
the locking portion of each slot comprises flattened edges on the slots for securely receiving the flattened parallel sides of the ferrule base.

23. The apparatus according to claim 22, wherein, the ferrule base has a cylindrical longitudinal exterior and has a stepped coaxial bore comprising the axial bore for receiving a portion of the fiber stub and a larger bore for receiving a portion of the ferrule.

24. The apparatus according to claim 23, wherein the cleaver is flat edge angled cleaver that is capable of cleaving the tip with an angled flat edge.

25. A method for mass producing a plurality of fiber optic mechanical splice-on connector subunits utilizing the apparatus of claim 1, the method comprising:
 (a) applying an epoxy into the axial bore in the ferrule base of the subunit;
 (b) inserting the fiber stub from the exterior of the subunit into the axial bore in the ferrule base and through the axial bore in the ferrule whereby the middle portion of the fiber stub is at least partially coated with said epoxy;
 (c) placing the subunit with a slot in the magazine and engaging the keying portion of the subunit with the locking portion of the slot;
 repeating steps (a) through (c) for a plurality of subunits to fill a corresponding plurality of slots in the magazine with said subunits;
 (d) mounting the magazine on the frame;
 (e) moving the magazine on the frame to orient a slot containing a subunit within the cleaving zone;
 (f) engaging the cleaver to cut the tip of the first portion of the fiber stub contained within the subunit;
 (g) disengaging the cleaver;
 (h) engaging the fiber holder mounted on the track to grasp the second portion of the fiber stub, and moving the fiber holder along the track away from the cleaver, without changing the radial orientation of the fiber stub within the subunit, until the first portion has a specified length;
 (i) disengaging the fiber holder from the second portion;
 repeating steps (e) through (i) for each slot containing a subunit in the magazine;
 (j) detaching the magazine from the frame;
 (k) placing the magazine in an oven to cure the epoxy within the subunits;
 (l) removing the magazine from the oven, and allowing the magazine to cool; and
 (m) disengaging the keying portion of each subunit from the locking portion of the slot to remove each subunit from the magazine and provide a plurality of subunits, each having the fiber stub disposed at a fixed radial orientation therein.

26. A method for mass producing a plurality of fiber optic mechanical splice-on connector subunits utilizing the apparatus of claim 13, the method comprising:
 (a) applying an epoxy into the axial bore in the ferrule base of the subunit;
 (b) inserting the fiber stub from the exterior of the subunit into the axial bore in the ferrule base and through the axial bore in the ferrule whereby the middle portion of the fiber stub is at least partially coated with said epoxy;
 (c) placing the subunit with a slot in the magazine and engaging the keying portion of the subunit with the locking portion of the slot;
 repeating steps (a) through (c) for a plurality of subunits to fill a corresponding plurality of slots in the magazine with said subunits;
 (d) mounting the magazine on the frame;
 (e) moving the cleaver and the track containing the fiber holder on the frame to orient the cleaving zone into alignment with a slot containing a subunit;
 (f) engaging the cleaver to cut the tip of the first portion of the fiber stub contained within the subunit;
 (g) disengaging the cleaver;
 (h) engaging the fiber holder mounted on the track to grasp the second portion of the fiber stub, and moving the fiber holder along the track away from the cleaver, without changing the radial orientation of the fiber stub within the subunit, until the first portion has a specified length;
 (i) disengaging the fiber holder from the second portion;
 repeating steps (e) through (i) for each slot containing a subunit in the magazine;
 detaching the magazine from the frame;
 (k) placing the magazine in an oven to cure the epoxy within the subunits;
 (l) removing the magazine from the oven, and allowing the magazine to cool; and
 (m) disengaging the keying portion of each subunit from the locking portion of the slot to remove each subunit from the magazine and provide a plurality of subunits, each having the fiber stub disposed at a fixed radial orientation therein.

\* \* \* \* \*

UNITED STATES PATENT AND TRADEMARK OFFICE
CERTIFICATE OF CORRECTION

PATENT NO.         : 8,494,331 B2                                    Page 1 of 1
APPLICATION NO.    : 13/176829
DATED              : July 23, 2013
INVENTOR(S)        : Takeuchi et al.

It is certified that error appears in the above-identified patent and that said Letters Patent is hereby corrected as shown below:

In the Claims

Col. 9:
Line 14 (claim 8): "edge angled" should read --flat edge angled--.
Line 41 (claim 13): "splice-cm" should read --splice-on--.

Col. 10:
Line 32 (claim 17): "side" should read --inside--.
Line 33 (claim 17): "therein:" should read --therein;--.

Col. 12:
Line 37 (claim 26): Insert --(j)-- before --detaching--.

Signed and Sealed this
First Day of October, 2013

Teresa Stanek Rea
*Deputy Director of the United States Patent and Trademark Office*